United States Patent [19]

Fuller et al.

[11] 4,117,888

[45] Oct. 3, 1978

[54] NOVEL FIELD CROP-THINNING APPARATUS AND METHOD

[76] Inventors: Lawrence W. Fuller, 7655 Bradley Rd., Moorpark, Calif. 93021; E. Dale Hawley, 7891 Camp Chaffee Rd., Ventura, Calif. 93001

[21] Appl. No.: 635,905

[22] Filed: Nov. 28, 1975

[51] Int. Cl.² .............................................. A01B 79/00
[52] U.S. Cl. ............................................ 172/1; 172/6
[58] Field of Search ................................ 172/1, 3, 6, 5; 123/102

[56] References Cited

U.S. PATENT DOCUMENTS

| 3,590,925 | 7/1971 | Troutner | 172/6 |
|---|---|---|---|
| 3,732,931 | 5/1973 | Field et al. | 172/6 |
| 3,766,895 | 10/1973 | Voss et al. | 123/102 |
| 3,776,316 | 12/1973 | Eberhart | 172/6 |

*Primary Examiner*—Paul E. Shapiro

*Attorney, Agent, or Firm*—Poms, Smith, Lande & Glenny

[57] ABSTRACT

Relates to a method of accurately and rapidly thinning commercial plantings of field crops by a motor-driven apparatus wherein the r.p.m. of the motor is converted into timing pulses and utilized in maintaining a virtually uniform rate of travel, the pulses being also utilized in energizing circuitry which controls instants of timing of the operation and deactivation of plant-sensing mechanisms and thinning knives through a control register which is presettable for mechanical lag and complete operating time whereby heretofore unattainable accuracy of thinning operations is attained under varying field conditions at high rates of progress. Also provides an apparatus which embodies a novel combination of mechanical improvements which overcome problems of weight, stability, flexibility, durability and dependability under various field conditions, and which employs the mode of operation above referred to.

1 Claim, 7 Drawing Figures

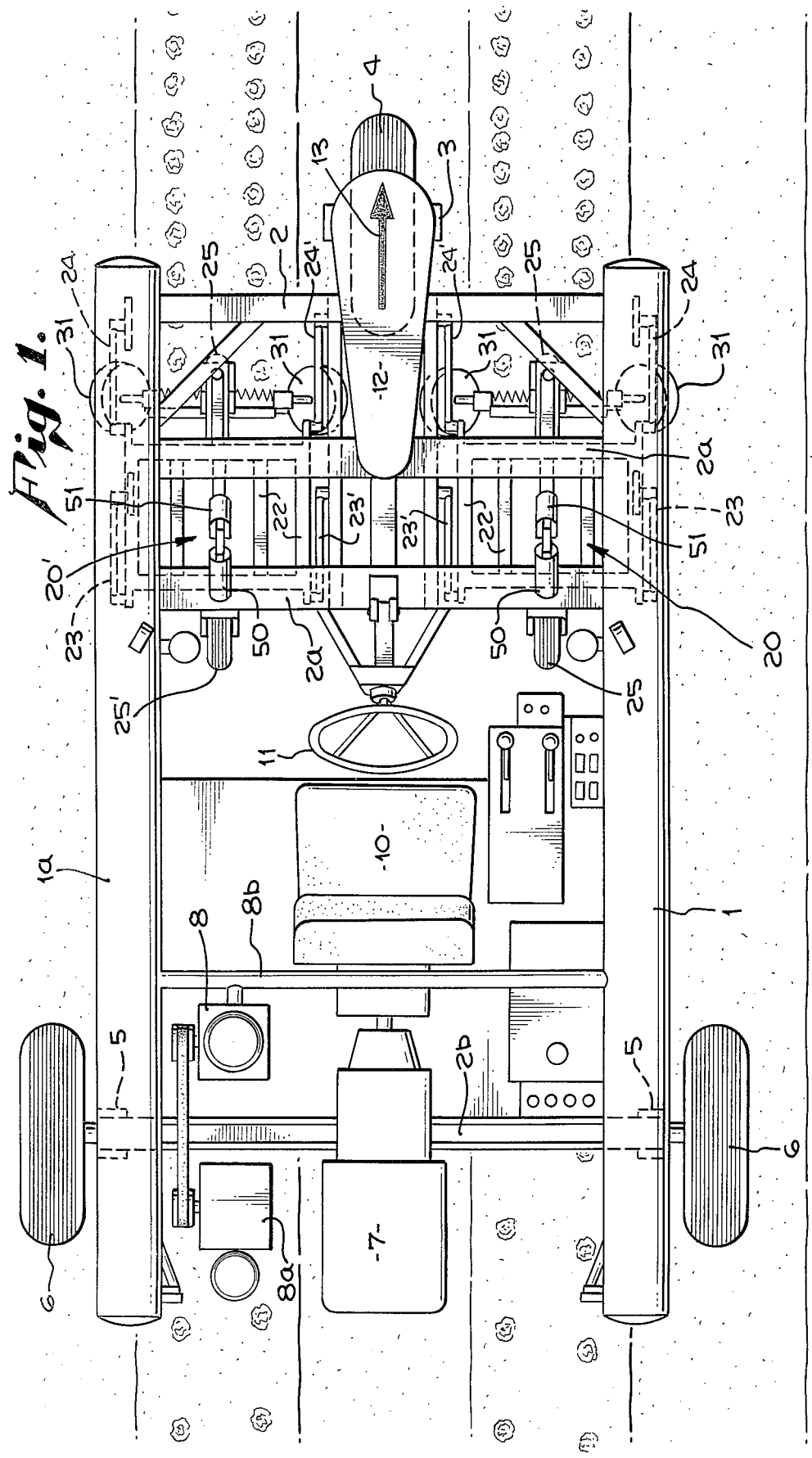

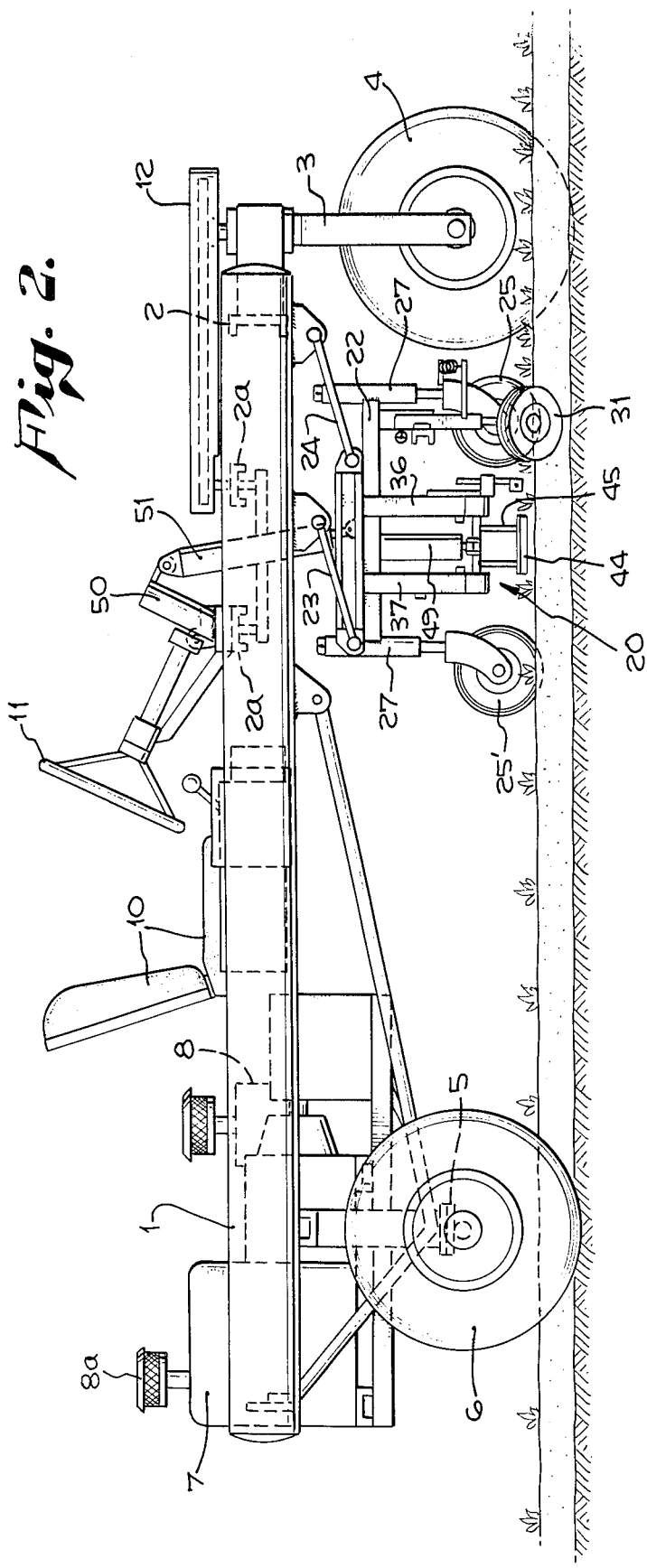

NOVEL FIELD CROP-THINNING APPARATUS AND METHOD

The efficient production of foodstuffs for a rapidly growing population is an essential factor in maintaining social stability. Land available and suited to the production of vegetables must be employed to best advantage with the least effort. Effective cultivation is essential, and high production of prime grade vegetables encourages the raising of food for those engaged in sedentary, civic and government jobs. Since the planting of most vegetables results in a non-uniform distribution of seed, clumps of seedlings fighting for nourishment are obtained and often fail to produce saleable specimens. To correct this, gangs of field laborers have been employed heretofore to laboriously thin out the seedlings in each row to a spacing which allows each plant to grow to optimum size, thereby permitting subsequent picking and packing without material sorting or discrimination. But the use of thirty to forty laborers to thin an acre per hour is expensive, and environmentalists have recently been instrumental in outlawing the short-handled hoe used by laborers in this thinning operation.

The present invention is directed to a motor-driven, scientifically designed, cultivating machine which, among other uses, is capable of thinning row crops to any desired spacing in an automatic manner, thereby permitting one operator to more effectively thin two acres of row crop within the same time that a gang of thirty laborers would cover two acres with the mediocrity due to individual ineptitude. The landowner's cost of production is reduced (although a capital investment is required of him); the quality of the crop is increased, and the populance (including the laborers) can get better vegetables at a lower or no higher price.

Attempts have been made in the past to provide mechanical thinning implements but their unsatisfactory operation is demonstrated by the continued use of hand labor. The use of photoelectric cell systems for sensing plants was described in U.S. Pats. No. 2,400,562, No. 2,514,405 and No. 2,507,001, all of which include mechanical hoes or plant-cutting tools. The mechanics of these expired patents, as well as those of later patents, fail to satisfy the need for a flexible, easily controlled machine capable of ready adjustment as to spacing between plants, for one which can operate in heavy clod-laden, adobe, soils as well as in loose, friable or sandy soils, for one which does not unnecessarily drag a plant-cutting tool through soil in the direction of travel of the machine, and for one which can operate on wide plant beds carrying two rows of plants as well as single row plantings, whether the rows are straight or curving along contours, without destroying the beds and damaging the plants unnecessarily.

The above-inidicated deficiencies and problems have been overcome by the method of operation and construction of the machine of this invention. Other objects and advantages will become evident from the following description of a preferred illustrative embodiment, it being understood that modifications coming within the scope of the claims are embraced thereby.

The invention hereafter described in detail includes a number of closely related, coordinating and coacting elements, aspects and modes of operation which distinguish it from prior attempts and failures. In order that plant thinning be effective, the mechanism of this invention responds accurately and quickly to perform its transverse cutting and thinning function (in a matter of thousandths of a second) to insure spacing and to eliminate longitudinal dragging while the entire machine is moving at a steady speed along the plant rows. The length of the longitudinally extending cutting blades preferably effectively establishes the spacing between remaining plants and these blades are normally in deactivated, raised position, thus preventing undue disturbance of the plant bed. Synchronization between the longitudinal speed of the machine and the actuation of the cutting blades is attained by an electronic system utilizing a pulse generated by a tachometer (optical chopper) described hereafter.

In operation in the field, the apparatus is traveling along the plant rows at all times at a selected speed of from 176 feet to 352 feet per minute, and even at the lower speed the two thinning knives may have to perform about 11,000 cutting operations per hour. Moreover, to attain efficient thinning, the sweep of the cutting knife must be in an arc such that the rear end of the knife barely misses the previously saved plant and that the cutting or thinning is effective from about $\frac{1}{2}$ inch of such previously saved plant. This is a particular requirement in thinning lettuce, where there occur many instances of doubles, i.e. two plants growing in adjacent relation, because if both such plants are saved the double is of no value and actually impairs the value of its neighbor. The plant-sensing, apparatus travel time for a distance equal to the length of the cutting blade, and the reaction times of the air valves, solenoids and actuating pistons in terms of microseconds must be taken into consideration in controlling the operation in order to attain efficiency. Our invention provides an automatic control system which can be readily adjusted to field conditions while the apparatus is in action to attain maximum efficiency under all conditions and is self-correcting when the terrain tends to vary the rate of travel of the apparatus. Upon any variance from the preselected rate of travel, the preferred mode of control advances or retards the throttle to attain the rate to which the unchanged reaction times of the valves, solenoids and pistons normally function.

This invention, therefore, includes a method of insuring fast and accurate operation of plant-thinning apparatus using oscillatable thinning knives of fixed length, fluid pressure actuating pistons, electrical valves and a driving motor means comprising establishing a tachometer clock pulse correlated to a desired rate of movement of said apparatus and motor speed corresponding thereto; calibrating the reaction time of electrical valves and actuating pistons and the length of thinning knives in terms of pulses required to move the apparatus the length of the knife blade after a plant sensor senses a plant, and automatically initiating the operation of knives upon expiration of the number of pulses remaining upon deducting the reaction time in pulses from the knife length time, in pulses.

An exemplary form of our machine and apparatus and the novel method of operation of our invention is illustrated in the appended drawings, to which reference is made in the subsequent description. In the drawings:

FIG. 1 is a plan view.

FIG. 2 is a side view of FIG. 1.

Figure 4:
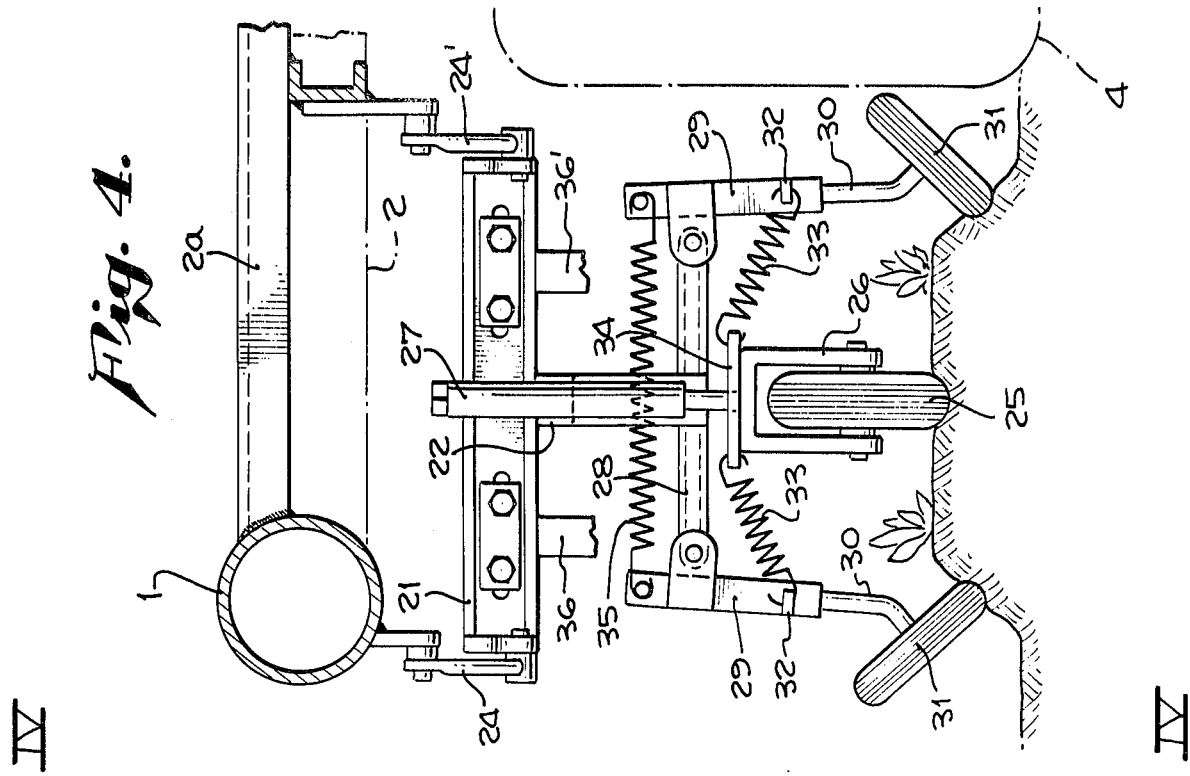
FIG. 4 is a front view of the fore portion of a thinning assembly, as from plane IV—IV in FIG. 3.

The various objectives of this invention, above referred to, as well as other advantages, will become apparent from the following description of the exemplary form of apparatus shown in the above figures. It is to be understood that minor details of construction and the obvious pneumatic piping required to supply fluid pressure valves and actuating pistons, pressure gauges, etc., are not illustrated in order to avoid confusion, such minor details being within the skill of competent mechanics.

In order to be able to use structural elements of a rigid frame as reservoirs for compressed air, the main frame of the self-contained, motor-driven apparatus comprises a pair of parallel, tubular side elements 1 and 1a having sealed end caps, extending from one end to the other of the apparatus, and a plurality of transverse members, such as 2, 2a, 2b, connecting and holding said reservoir elements in spaced, parallel relation. The foremost of the transverse members is provided with a centrally disposed, forward extension in which there is journaled the upstanding pivot pin of a downwardly extending yoke 3 with a front guiding and supporting wheel 4 journaled in said yoke. The rear portions of side elemets 1 and 1a are connected by 2b which includes downwardly inclined portions connected to a transversely extending rear axle and differential assembly 5 carrying a ground-contacting driving wheel 6 at each end of the axle, 2b and suitable extensions cooperating to form a mount for a motor 7 and a compressor 8 with its auxiliary motor 8a, the compressor supplying pressure air by line 8b to the side elements. A seat 10 for the driver and operator is provided on the main frame, behind the steering wheel 11, which may impart suitable rotation to a sprocket and chain driving connection to a sprocket mounted on the upper end of the pivot pin of yoke 3, this chain and sprocket drive being covered by the housing 12 provided with the arrow 13 to facilitate visual guidance of the apparatus with the front wheel 4 between two raised plant beds.

The main, rigid frame has a pair of laterally spaced, plant-thinning assemblies generally indicated by 20 and 20' suspended from the main frame, one on each side of the longitudinal center line of the frame and above a plant bed. The apparatus illustrated is adapted to simultaneously operate on two adjacent plant beds, each having two rows of plants which are thinned by one of the plant-thinning assemblies, and for purposes of simplification, the description will be limited to the construction of one such assembly to avoid duplication, since both are identically suspended and constructed. It may be noted that both 20 and 20' are forward of the operator and in his field of vision, and may be individually raised and timed for thinning, as subsequently described.

Figure 3:
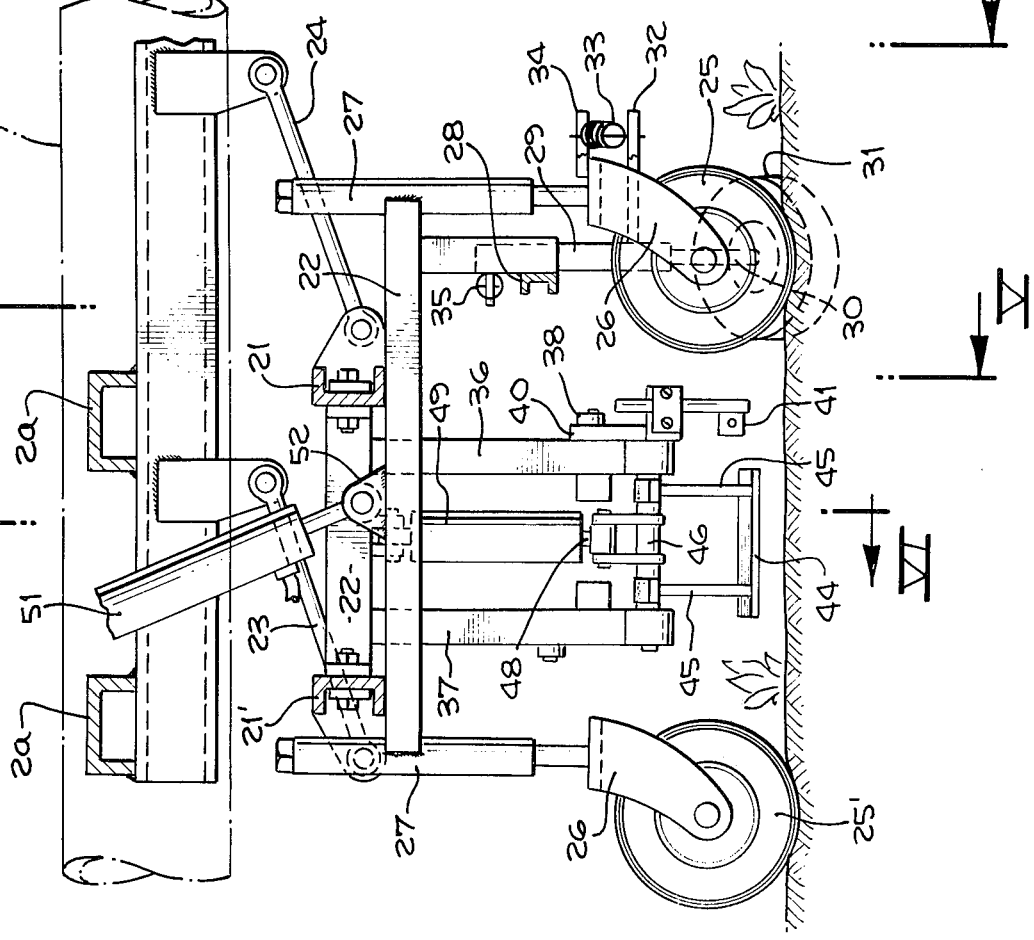
FIG. 3 is an enlarged, side elevation of a thinning assembly floatingly suspended from the main frame.
Figure 5:
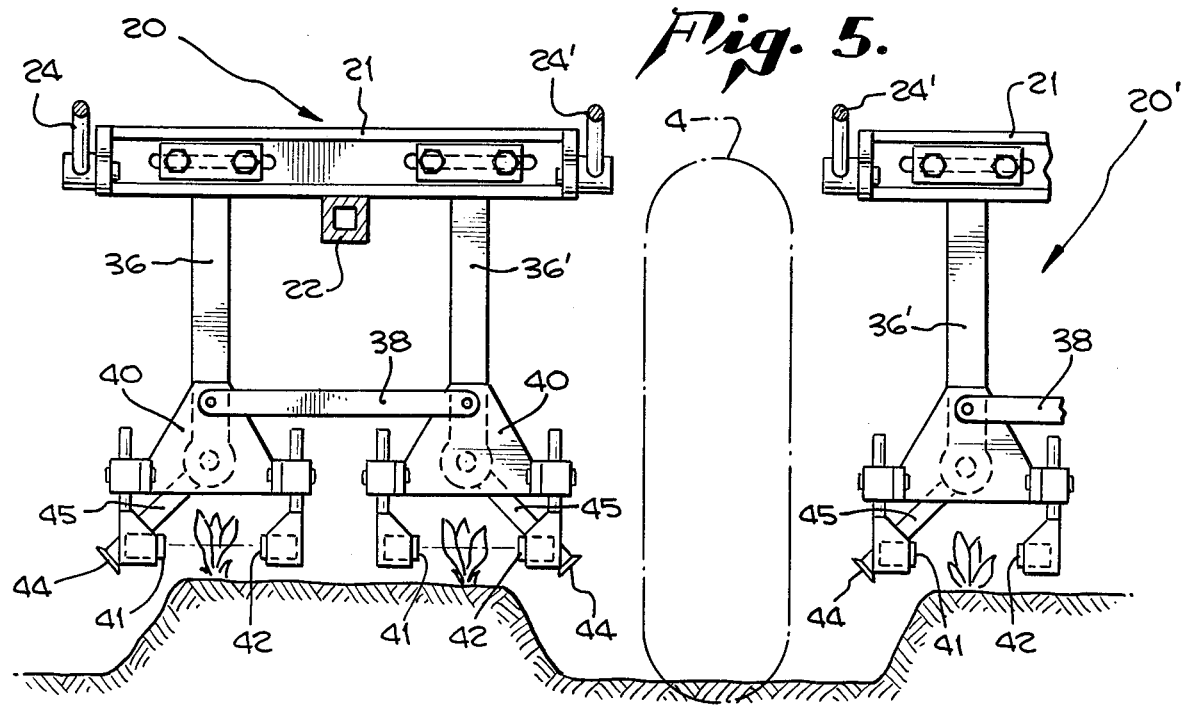
FIG. 5 is a transverse view taken along vertical plane V—V in FIG. 3.

FIGS. 3, 4 and 5 provide a showing of details of assembly 20, while FIG. 1 assists in understanding placement and suspension. The upper part of each assembly includes a subframe composed of transverse members 21 and 21' and longitudinal members 22. This sub-frame (and its dependent components) is connected to the lower, trailing ends of link bars 23 and 24 (and similar bars 23' and 24'), the upper ends of these link bars being connected to brackets welded to the tubular side element 1 and to other central portions of the main frame, all link bar connections being of the ball bearing, self-aligning type, so as to permit the sub-frame 20 to move laterally as well as vertically. The importance of attachment to the downwardly trailing ends of the link bars will become apparent later.

Each assembly 20 includes a forward 25 and a rearward 25' ground-contacting wheel, each mounted in a castor-type yoke 26 provided with a pin journaled for movement about a vertical axis in tubular sleeves 27 attached to the sub-frame of the assembly. These ground-contacting wheels are positioned so as to contact and travel along the ground between the two rows of plants on the top of a plant bed. As shown in FIGS. 3 and 4, a vertical strut extending downwardly from the sub-frame 20 in parallel, spaced relation with frontal sleeve 27 carries a horizontal bar 28 to each end of which there is adjustably and pivotally connected a berm arm 29 provided with an axially adjustable extension 30 having a curved lower end with a berm-following wheel 31 journaled thereon, the axis of rotation being approximately parallel to and in a plane parallel to the surface of the berm, whereby the wheels 31 may contact the berms on both sides of a plant bed. Skids with curved noses could be substituted for the berm wheels 31, but are not as effective. It may be noted that each berm arm 29 carries a forwardly extending lever arm 32 which is connected by a spring 33 to a lever 34 connected to the top of the pivoted yoke 26. The upper ends of berm arms 29 are connected by tension spring 35. By introducing turnbuckles in the spring connection to adjust tension in the system, the berm wheels may bear against the berm with a suitable pressure. Means are thus provided responsive to changes in direction of the plant bed, to guide the front ground-contacting wheel 25 between two rows of plants at all times.

To the rear of the frontal guiding and berm wheels of each assembly 20 and suspended from the sub-frame are downwardly extending pairs of struts 36 and 37 in longitudinal alignment, each pair being preferably spaced laterally a distance equal to the spacing between the two rows of plants on a plant bed (see FIGS. 4 and 5). These struts are laterally adjustable in the zone of attachment to the sub-frame 20, 21 and carry the plant-sensing and thinning devices 41 and 42 at their lower end portions, and, as shown in the example of FIG. 5, may be connected by a laterably adjustable strap 38. The lower end of each strut 36 may be provided with a winged bracket plate 40 to hold and position a ray source 41 and a receptor 42 sensitive thereto in suitably spaced and aligned relation on opposite sides of a plant row. The devices 41 and 42 are preferably carried by tubular elements which can protect the electrical conductors extending therethrough and can be adjusted longitudinally and angularly in suitable clamps connected to bracket plate 40.

The lower end of each pair of struts 36 and 37 is also provided with a plant-thinning, double-edged knife blade, means for supporting it for oscillatory movement about an axis parallel to the movement of the entire apparatus, and means for imparting such movement when required, under the electronic controls preset by the operator. The longitudinally extending knife blade 44 (see FIGS. 3, 5 and 6) is shown attached to arms 45 carried by a sleeve 46 journaled on aligned pins extending from struts 36–37 so as to permit the blade to travel in an arc around an axis above and parallel to a row of plants. Cutting or thinning with minimum of soil disturbance can thus be obtained. Each sleeve 46 is provided with an arm 47 (FIG. 6) connected to the end of a piston rod 48 extending from a piston 49 powered by compressed air in a cylinder pivotally suspended from the sub-frame 20. The sleeve 46 also carries bumper arms provided with elastic facings adapted to contact stationary bumper pads carried by struts 36 and 37 and absorb and cushion the rapid movement of the sleeve and its arms and knife at the end of a cutting stroke. Since the apparatus operates often and very rapidly, such or similar means to absorb shock and prevent metal fatigue are necessary.

Figure 6:
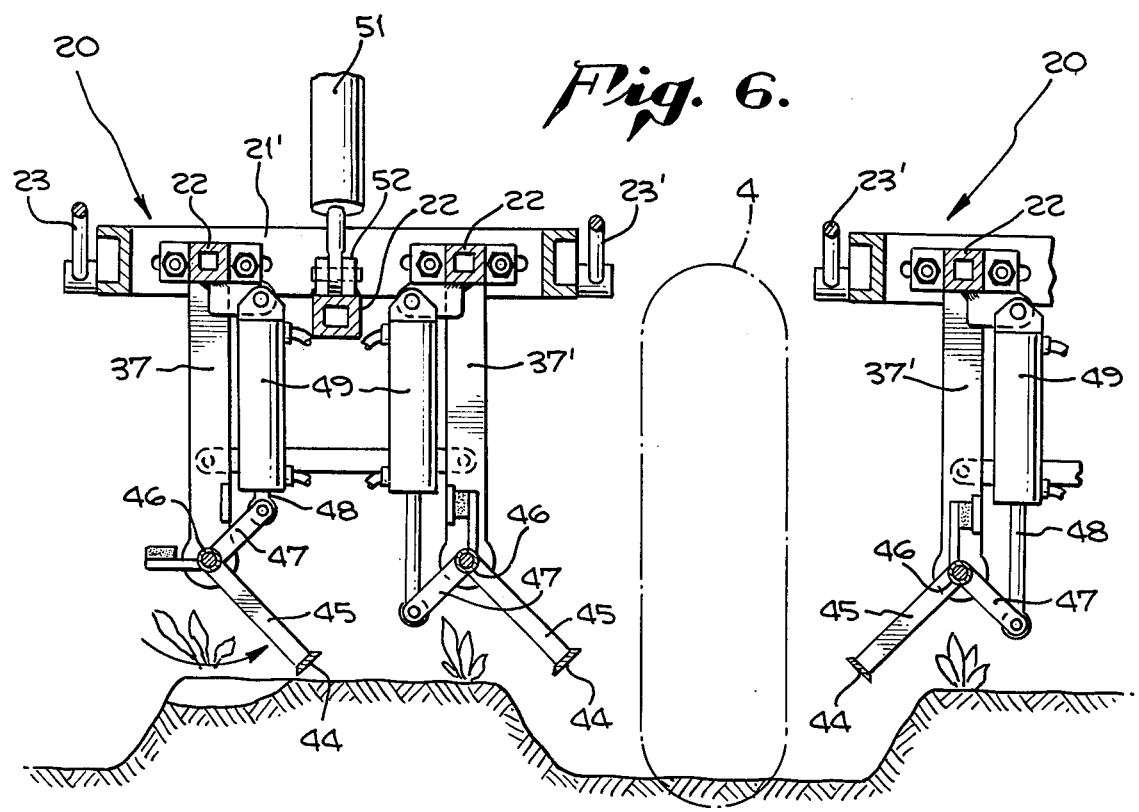
FIG. 6 is a transverse view taken along vertical plane VI—VI in FIG. 3.

Means for actuating each power cylinder 49 and associated knife may include a solenoid-operated pilot air valve which controllably supplies pressure air from hollow reservoir elements 1 and 1a to four-way valves suitably located between struts 36–37. The thinning cut of each knife 44 is from one side to the other side of a plant row, as indicated in FIG. 6. The entire length of the knife blade is used and its length determines the spacing between remaining plants. The depth of the cut is governed by the length of arms 45 and the ground-contacting wheels 25 and 25' of the floating assembly 20, since the vertical journal pins connected to the castor-type yokes may be adjusted in the sleeves 27 and thereby modify the plane above ground assumed by the floating assembly 20.

It is to be noted that the knife-operating pistons in cylinders 49 positively move the associated thinning knife from an inactive position on one side of a plant row, through a cutting arc, to an inactive position on the other side of the plant row, and when again actuated, reverse the direction of cut back to the initial position. These movements must be rapid and accurately timed. As can be seen from FIG. 6, the piston in the left cylinder 49 is at the top of its stroke and in the upper portion of the cylinder, and when pressure air is admitted into the top of the cylinder, such air will act on the entire end area of the piston. But on the next stroke, pressure air has to be introduced into the lower portion of the cylinder which contains the piston rod, thereby reducing the effective volume and area, so that the reaction time of this cut will differ from that for the first-described stroke. To insure positive control and operation, the electronic control system includes circuitry which regulates right and left movements individually, and compensates for variations in reaction time of actuating mechanisms in microseconds as well as linear velocity of the entire apparatus.

When it is desired to move the entire apparatus from one field to another or to storage, the floating assembly is raised by fluid pressure means including an upstanding, forwardly inclined king post 50 mounted on transverse member 2a of the rigid main frame (FIG. 2) and a power cylinder 51 having its upper end pivotally connected to the king post, the piston rod extending from the lower end and pivotally connected by a ball and socket fitting to an upstanding bracket 52 welded to the floating assembly 20 (FIG. 3). Means are provided for supplying pressure air to the lower part of power cylinder 51 to raise the assembly and its appurtenances out of contact with the ground, and for allowing this pressure air to escape and allow the assembly to descend by gravity alone when desired, and such means may include a manual, driver-controlled valve for raising the assembly and suitable bleed ports in the cylinder for gentle gravity lowering. The assembly, in working, ground-contacting position of its wheels can thus freely move up and down (and laterally to some extent) with changes of elevation and direction of the plant bed since only the mass of the assembly and gravity are involved.

Figure 7:
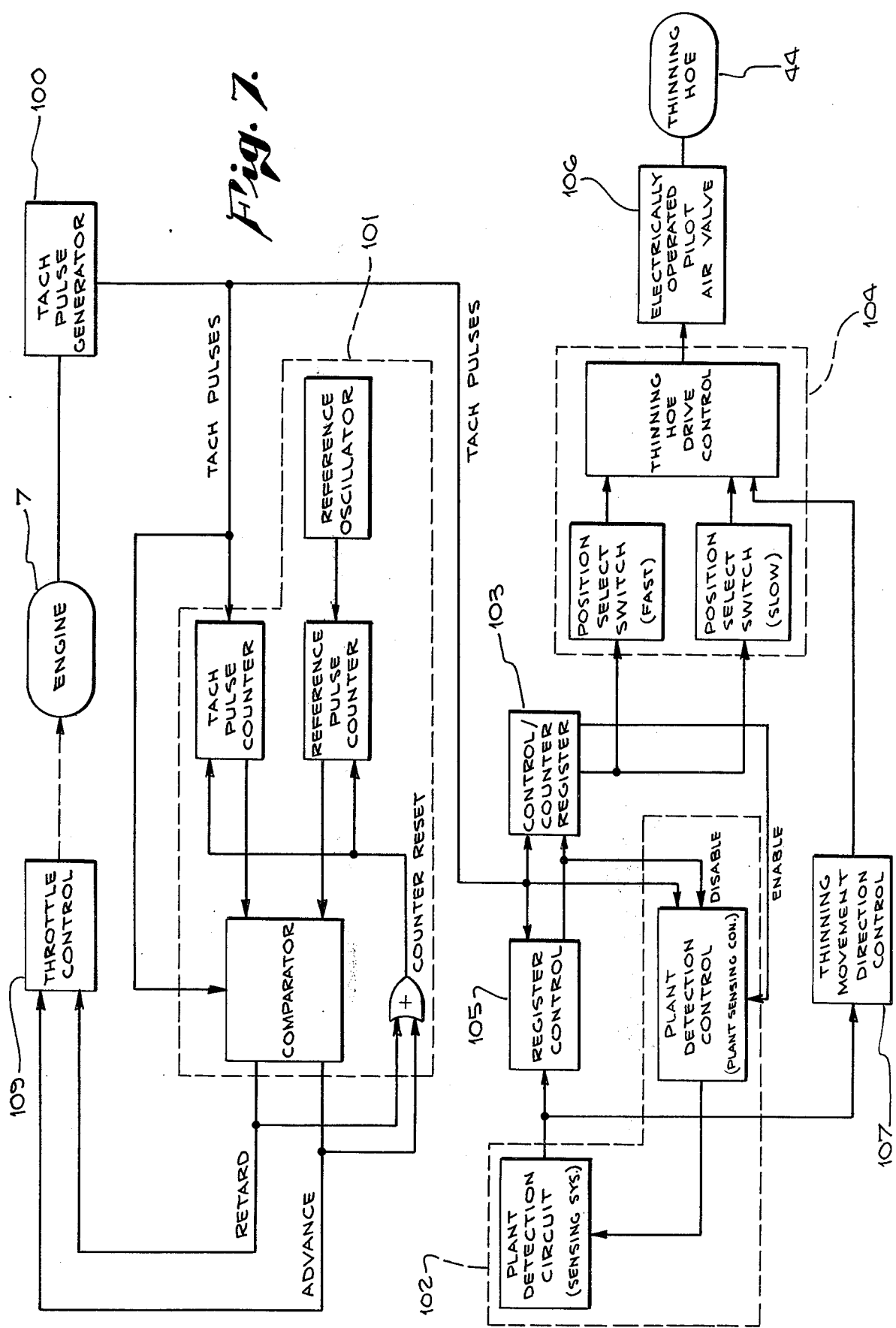
FIG. 7 is a schematic flowchart illustrating the method of this invention.

The effective operation of a machine capable of simultaneously thinning two rows of plants at a rapid rate of travel has not been attained heretofore. The present invention permits rapid and efficient operation which simultaneously thins four (or more) rows of plants by the use of a unique mode of operation involving an electronic control system governed by (or indexed to) a tachometer clock pulse correlated to desired rate of movement of the apparatus. Such a pulse may be initially generated by a pulse generator 100 (FIG. 7) such as a shutter or chopping rotor (driven by the motor driving the entire machine) interrupting infra red rays between a source and a receptor, or can be produced by inductive means. Such clock pulse is then correlated to a desired rate of movement of the apparatus along the plant rows and to a motor speed (r.p.m.) corresponding thereto. Means 101 such as a dual level comparitor are provided to maintain the pulse frequency within a narrow valid band to maintain constant the apparatus speed or rate of advance. A shaper circuit may be introduced to accentuate the pulse into virtually square wave form. This clock pulse system is used to automtically and accurately program the actuation of the cuttig knives with relation to the instant that the plant-sensing circuitry 102 indicates that a plant is to be saved, automatically make allowance for a reaction and performance times of air valves and mechanical actuation of pistons and length of knife blades, whereby the thinning cut of each knife may be instantaneously and accurately accomplished during linear movement of the apparatus along a plant row or rows at a rate of 50 to 70 inches per second with not over about one-half inch of unthinned plant row behind unthinned plants.

The core of the electronic control circuitry is a control register 103 which may be said to comprise a large number (20 to 50) of gating units or flip-flops in series, receiving the tachometer pulse and which is present to deactivate each cutting knife, to deenergize the plant-sensing circuitry 102 and activate the plant-thinning knife in a specified plant row at a pulse time which is present to allow for the pulse time lag in response and operation of the valve and piston employed to actuate the thinning knife in a specified plant row, and reactivate the plant sensing circuit. Means 104 are provided for visually presetting all operations and modifying the time of initiation of the thinning operation so that the thinning may include plants within 1 inch, or even ½ inch, behind the thrifty plant sensed and to be retained. Moreover, when two rows of plants on a single plant bed are being thinned, a different program (differing in microseconds) can be used on one row from that employed on the adjacent row of plants.

In addition to the normal battery, starting motor and ignition switch, the electrical system may include a visual means for indicating the raised right end left positions of each thinning knife and a master reset switch to preset all of the thinner control circuitry which will supply battery current to the electrically operable valves and the plant-sensing system at precise instants of time and travel of the machine (preferably when the machine is moving at a constant rate of speed with automatic speed control and clocking pulses being generated) and which are equated to a precise distance traveled for each pulse period or interval. Presettable means 104 are provided for assuring energization of each of the thinning knives in proper timed relation to the response and deenergization of its related plant-sensing means and reenergization upon completion of the thinning stroke, with suitable compensation for response time of the valve movement and associated piston actuation. These presettable means preferably include a control register 103 which is monitored by a register monitor, both responding to the clocking pulses.

The control register 103 is preferably presettable, multistage series with available outputs and functions as a multistage serial shift register, shifting one stage with each input timing pulse, each stage being wired to two select switches in parallel. The output of preselected switches of the control register is applied to switches closing power circuits associated with an electrically operated pilot air valve 106 to move each knife in the desired direction of swing, the latter being automatically dictated by a direction control circuit 107 which changes status with each new plant detected in a given row. The ultimate timing of each knife movement is under control of the preselected switch setting of the control register 103. Only one stage is selected at a time by each individual select switch.

The plant-sensing system is disabled during knife actuation and until the control register has confirmed that the entire machine had traveled a distance (in number of pulses) equal to the length of the cutting knife and that knife has completed its cutting stroke, whereupon the next pulse received by the control register re-energizes the plant-detection circuit. Presetting the numerous sequential series of switches provided by the control register assures accurate timing of all operations in proper order. The circuitry is self-confirming and a power circuit is not closed unless the preceding operation or position has been completed or attained.

It will be understood that pressure gauges, electronic wiring, tubing for compressed air pressure relief valves and other details, sizes of piping, tires, etc. have not been indicated, since those skilled in the mechanical and electrical fields can readily supply these from their general knowledge in the light of our description and required performance.

We claim:

1. A method of accurately and rapidly thinning commercial plantings of field crops by a motor-driven apparatus including a plant-sensing system and associated thinning knives and provided with pneumatic means for moving thinning knives through cutting strokes and electrically operable valves for supplying the pneumatic means with pressure fluid, comprising:

converting the r.p.m. of the driving motor into timing pulses;

utilizing said pulses to maintain the apparatus at a virtually uniform rate of travel;

and utilizing said pulses to energize the plant-sensing system and said valves in desired preset sequence and intervals initiated by the plant-sensing system.

* * * * *

UNITED STATES PATENT OFFICE
CERTIFICATE OF CORRECTION

Patent No. 4,117,888          Dated October 3, 1978

Inventor(s) Lawrence W. Fuller et al.

It is certified that error appears in the above-identified patent and that said Letters Patent are hereby corrected as shown below:

Column 6, line 27, "cuttig" should read -- cutting --.

Column 7, line 9, after "monitor" to read --- 105 ---.

Signed and Sealed this

Thirteenth Day of February 1979

[SEAL]

Attest:

RUTH C. MASON
Attesting Officer

DONALD W. BANNER
Commissioner of Patents and Trademarks